US012530425B2

(12) United States Patent
Tian et al.

(10) Patent No.: US 12,530,425 B2
(45) Date of Patent: Jan. 20, 2026

(54) COMPUTING WITH OPTICAL SIGNAL

(71) Applicant: UNITED MICROELECTRONICS CENTER CO., LTD, Chongqing (CN)

(72) Inventors: Ye Tian, Chongqing (CN); Yang Zhao, Chongqing (CN); Shengping Liu, Chongqing (CN); Wei Wang, Chongqing (CN); Qiang Li, Chongqing (CN); Junbo Feng, Chongqing (CN); Jin Guo, Chongqing (CN)

(73) Assignee: UNITED MICROELECTRONICS CENTER CO., LTD, Chongqing (CN)

( * ) Notice: Subject to any disclaimer, the term of this patent is extended or adjusted under 35 U.S.C. 154(b) by 781 days.

(21) Appl. No.: 17/894,996

(22) Filed: Aug. 24, 2022

(65) Prior Publication Data

US 2022/0405350 A1 Dec. 22, 2022

Related U.S. Application Data

(63) Continuation of application No. PCT/CN2020/128358, filed on Nov. 12, 2020.

(30) Foreign Application Priority Data

Jun. 9, 2020 (CN) .......................... 202010520124.8

(51) Int. Cl.
*G06F 17/16* (2006.01)
*G02F 1/21* (2006.01)
*G02F 1/225* (2006.01)

(52) U.S. Cl.
CPC .............. *G06F 17/16* (2013.01); *G02F 1/212* (2021.01); *G02F 1/225* (2013.01)

(58) Field of Classification Search
CPC .......... G06F 17/16; G02F 1/212; G02F 1/225
USPC ......................................................... 359/107
See application file for complete search history.

(56) References Cited

U.S. PATENT DOCUMENTS

| 2006/0188032 | A1 | 8/2006 | Kim et al. | |
| 2017/0351293 | A1* | 12/2017 | Carolan | G06N 3/0675 |
| 2019/0356394 | A1* | 11/2019 | Bunandar | G06F 17/16 |

FOREIGN PATENT DOCUMENTS

| CN | 102647259 A | 8/2012 |
| CN | 107923816 A | 4/2018 |
| CN | 108599865 A | 9/2018 |
| CN | 109477938 A | 3/2019 |
| CN | 110289914 A | 9/2019 |
| CN | 110852431 A | 2/2020 |

(Continued)

*Primary Examiner* — Stephone B Allen
*Assistant Examiner* — Leonidas Boutsikaris
(74) *Attorney, Agent, or Firm* — MASCHOFF BRENNAN; Liang Huang

(57) ABSTRACT

A computing apparatus is provided. The apparatus includes: an input port to receive a first optical signal; a matrix calculation unit having a transmission matrix and configured to use the transmission matrix to process the first optical signal to obtain a second optical signal, where the second optical signal has a complex amplitude, and the transmission matrix is a unitary matrix M'; a real part obtaining unit optically coupled to the matrix calculation unit and configured to obtain, from the second optical signal, a third optical signal representing a real part of a complex amplitude of the second optical signal; and an output port configured to output an optical signal.

18 Claims, 6 Drawing Sheets

(56) References Cited

FOREIGN PATENT DOCUMENTS

| | | | |
|---|---|---|---|
| CN | 110881947 | A | 3/2020 |
| CN | 111198593 | A | 5/2020 |
| WO | 2019222185 | A1 | 11/2019 |
| WO | 2019236591 | A1 | 12/2019 |
| WO | 2020071914 | A1 | 4/2020 |

* cited by examiner

COMPUTING WITH OPTICAL SIGNAL

CROSS REFERENCE TO RELATED APPLICATIONS

The present application is a continuation of PCT International Application No. PCT/CN2020/128358, filed on Nov. 12, 2020, which claims priority to Chinese Patent Application No. 202010520124.8, filed on Jun. 9, 2020, the content of which is incorporated herein by reference in its entirety for all purposes.

TECHNICAL FIELD

The present disclosure relates to a computing apparatus, a computing method, and a computing system.

BACKGROUND

As one of the currently hottest research fields of artificial intelligence, deep learning involves a large number of matrix multiplications. Using light for a matrix operation is one of the emerging research directions.

SUMMARY

According to an aspect of the present disclosure, a computing apparatus is provided, the computing apparatus including: an input port to receive a first optical signal; a matrix calculation unit having a transmission matrix and configured to use the transmission matrix to process the first optical signal to obtain a second optical signal, where the second optical signal has a complex amplitude, and the transmission matrix is a unitary matrix (Mi); a real part obtaining unit optically coupled to the matrix calculation unit and configured to obtain, from the second optical signal, a third optical signal representing the real part of the complex amplitude of the second optical signal; and an output port to output an optical signal.

According to an aspect of the present disclosure, a computing method is further provided, the computing method including: processing the first optical signal by using a transmission matrix to obtain a second optical signal, where the second optical signal has a complex amplitude, and the transmission matrix is a unitary matrix; and obtaining, from the second optical signal, a third optical signal representing a real part of the complex amplitude of the second optical signal.

According to another aspect of the present disclosure, a computing system is further provided, the computing system including at least one layer, where the at least one layer includes a first layer including: a first computing apparatus including: an input port to receive a first optical signal; a matrix calculation unit having a transmission matrix and configured to use the transmission matrix to process the first optical signal to obtain a second optical signal, wherein the second optical signal has a complex amplitude, and the transmission matrix is a unitary matrix M' a real part obtaining unit optically coupled to the matrix calculation unit and configured to obtain, from the second optical signal, a third optical signal representing a real part of the complex amplitude of the second optical signal; and an output port to output an optical signal.

Through the following detailed description of example embodiments of the present disclosure with reference to the accompanying drawings, other features and advantages of the present disclosure will become clear.

BRIEF DESCRIPTION OF THE DRAWINGS

The accompanying drawings constituting a part of the specification describe embodiments of the present disclosure and are used to explain principles of the present disclosure together with the specification.

The present disclosure may be more clearly understood from the following detailed description with reference to the accompanying drawings, where.

Figure 1:
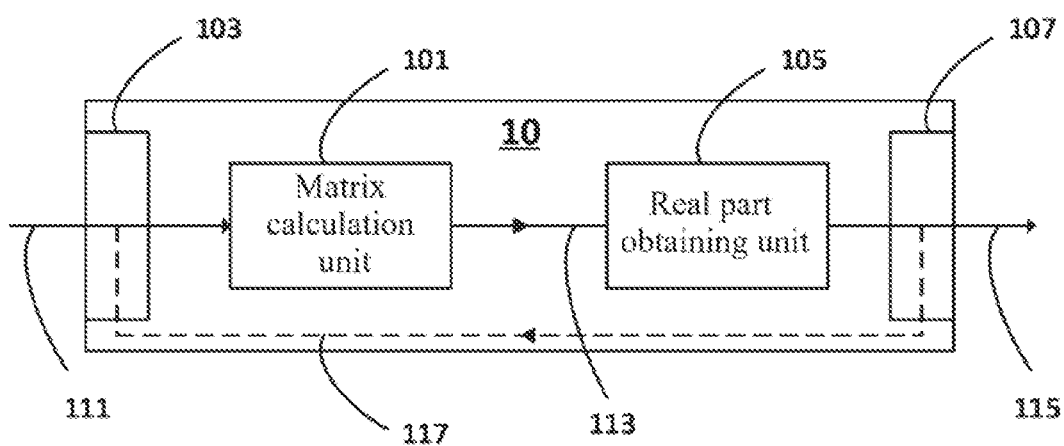
FIG. 1 shows a schematic block diagram of a computing apparatus according to some embodiments of the present disclosure.

It should be noted that in the implementations described below, the same reference numerals are sometimes used in common between different drawings to denote same parts or parts with same functions, and repetitive descriptions thereof are omitted. In the specification, similar reference signs and letters refer to similar items. Therefore, once a specific item is defined in one of the drawings, it does not need to be further discussed in subsequent drawings.

For ease of understanding, a position, size, range, and the like of each structure shown in the drawings may not indicate an actual position, size, range, and the like. Therefore, the disclosed invention is not limited to the position, size, range, and the like disclosed in the drawings and the like.

DETAILED DESCRIPTION OF EMBODIMENTS

Various example embodiments of the present disclosure will now be described below in detail with reference to the accompanying drawings. It should be noted that: unless otherwise specifically stated, relative arrangements of the components and steps, numerical expressions, and values described in these embodiments constitute no limitation on the scope of the present disclosure. In addition, technologies, methods and devices known to those of ordinary skill in the related art may not be discussed in detail, but should be considered as part of the authorization specification where appropriate.

It should be understood that the following description of at least one example embodiment is merely illustrative and does not serve as any limitation on the present disclosure and its application or use. It should also be understood that any implementation described exemplarily herein does not necessarily mean that it is preferred or advantageous over other implementations. The present disclosure is not limited by any expressed or implied theory given in the above technical field, background, summary, or detailed description of embodiments.

In addition, certain terms may also be used in the following description for reference purposes only, and thus are not intended to be limiting. For example, unless specifically indicated by the context, the words "first", "second" and other such numerical words referring to structures or elements do not imply an order or a sequence.

It should also be understood that the terms "comprise/include" when used herein, specify the presence of stated features, integers, steps, operations, units, and/or components, but do not preclude the presence or addition of one or more other features, integers, steps, operations, units and/or components, and/or combinations thereof.

In addition, as is well known in the art, "complex numbers" includes real numbers and imaginary numbers. A complex number may be expressed as including a real number part (also called as a real part) and an imaginary number part (also called as an imaginary part). For example, one complex number may be expressed as a +ib, where a and b are real numbers, and i is an imaginary unit. Herein, a may be called as the real part, and ib may be called as the imaginary part. An "imaginary number" generally refers to a complex number whose imaginary part is not 0 (that is, b is not 0), where a complex number whose real part is 0 (that is, a is 0) and whose imaginary part is not 0 (that is, b is not 0) is called as a "pure imaginary number". A "real number" may be regarded as a complex number whose imaginary part being 0 (that is, b is 0).

In the specification, a "real matrix" is a matrix where every element is a real number. A "complex matrix" is a matrix where at least one element is a complex number whose imaginary part is not 0 (namely the imaginary number).

In addition, a vector of one matrix mentioned in the specification may be a row vector or a column vector of the matrix.

As previously described, performing a matrix operation with light is one of the emerging research directions in the field of artificial intelligence (especially deep learning). However, the inventors of the present application recognize that there are a variety of problems with an optical chip for the matrix operation.

To complete the matrix operation with light, one method is to use a transmission matrix of an optical chip to simulate the first matrix for matrix multiplication, and use an expression of modulated light entering into the optical chip to simulate the second matrix for the matrix multiplication. Transmission of the modulated light in the optical chip is equivalent to the transmission matrix of the optical chip multiplied by the expression of the modulated light entering into the optical chip, so that an expression of the modulated light leaving the optical chip is a product of the two matrices.

To simulate the first matrix for matrix multiplication using the transmission matrix of the optical chip, one method is to decompose this matrix into two unitary matrices and a diagonal matrix through singular value decomposition (SVD). Both the unitary matrix and the diagonal matrix may be simulated by a Mach-Zehnder interferometer (MZI). The Mach-Zehnder interferometer (MZI) may include an array of a plurality of MZI units. MZIs that simulate these three matrices are spliced together to form an optical chip, and the optical chip may represent the original matrix.

The inventors of the present application recognize that there are some problems with this method.

In an aspect, light passes through a large number of MZI units in the optical chip, and beam splitters that constitute the MZI units may cause losses, resulting in a large loss of light in the optical chip. In another aspect, each interferometer unit is controlled by at least one (usually two) phase shifter, and each phase shifter has a certain area and an independent pin. As a result, an increase in the number of the phase shifters leads to an increase in the number of pins and an area of a photonic artificial intelligence chip. In still another aspect, the increase in the number of pins and the increase in the area of the photonic artificial intelligence chip may increase the difficulty of packaging and testing the photonic artificial intelligence chip.

To a certain extent, these limits further improvement of a computing capability of the photonic artificial intelligence chip. Therefore, there is a need for an improved computing apparatus, an improved computing method, and an improved computing system.

In view of this, the present disclosure provides a novel computing apparatus, computing method, and computing system. The computing apparatus, computing method, and computing system according to the present disclosure have completely new conceived structures or features.

In addition, the computing apparatus, computing method, and computing system according to the present disclosure may further reduce losses in the photonic artificial intelligence chip, reduce the use of elements, simplify the chip structure, reduce the chip area, reduce the number of pins, reduce costs, and/or improve the performance, and so on.

FIG. 1 shows a schematic block diagram of a computing apparatus according to some embodiments of the present disclosure. In some embodiments, the computing apparatus according to the present disclosure may be implemented in a form of a packaged or an unpackaged chip. However, it should be understood that the present disclosure is not limited thereto. For example, in some embodiments, it is also possible to implement certain solutions of the present disclosure in a form of non-integration.

As shown in FIG. 1, a computing apparatus 10 may include a matrix calculation unit 101. The matrix calculation unit 101 is optically coupled to an input port 103 to receive a first optical signal 111 through the input port 103. The matrix calculation unit 101 has a transmission matrix S, and is configured to use the transmission matrix S to process the first optical signal 111 received through the input port 103 to obtain a second optical signal 113. The second optical signal 113 has a complex amplitude.

The transmission matrix of the matrix calculation unit 101 may be a unitary matrix (hereinafter denoted as M', which is described more specifically later). The inventors of the present disclosure realized that although the unitary matrix itself cannot be used to represent any matrix, a real part of the unitary matrix may be used to implement a representation of any real matrix, which is described more specifically below. In some implementations, at least one element of the unitary matrix M' is a complex number whose imaginary part is not 0. In some implementations, a modulus of each element on a main diagonal of the unitary matrix W is 1.

In some implementations, the matrix calculation unit 101 may be implemented as including one or more of the following: a Mach-Zehnder interferometer (MZI), a multimode interferometer, a directional coupler, a photonic crystal, a micro-ring resonator, another optical component whose operating characteristics are capable of being described by the unitary matrix, or any combination of any of the above apparatuses. It should be understood that these are only examples of the matrix calculation unit that may implement the present disclosure, and the present disclosure is not limited thereto.

The input port 103 may be implemented in various manners. For example, the input port 103 may be implemented by various mediums capable of transmitting light, for example, may be implemented by a waveguide array. It should be understood that the present disclosure is not limited thereto. In some embodiments, the input port may be configured to receive an optical signal from an optical input unit (described later).

The computing apparatus 10 may further include a real part obtaining unit 105. The real part obtaining unit 105 is optically coupled to the matrix calculation unit 101, and is configured to obtain, from the second optical signal 113, a third optical signal 115 representing the real part of the complex amplitude of the second optical signal 113.

The computing apparatus 10 may include an output port 107 to output an optical signal. In some embodiments as shown in FIG. 1, the output port 107 is coupled to the real part obtaining unit 105 to output the third optical signal 115. In another embodiment, the output port 107 may also selectively output, for example, the first optical signal 111 or the second optical signal 113.

The real part obtaining unit 105 may be implemented as including one or more of the following: a multimode interferometer, a directional coupler, another component that is capable of implementing light-light interference, or any combination of any of the above apparatuses.

An implementation of the output port 107 may be the same as that of the port 103, and is not repeated herein.

In addition, in some implementations, at least part of the third optical signal 115 may further be provided to the input port 103, as shown by a dash line 117 in FIG. 1, so as to perform feedback and loop processing of the optical signal. Therefore, the computing apparatus of this implementation may be used to implement a recurrent neural network.

The first optical signal 111 may include a first array of light. The first array of light is configured to represent an input matrix or a vector of the input matrix.

Figure 3:
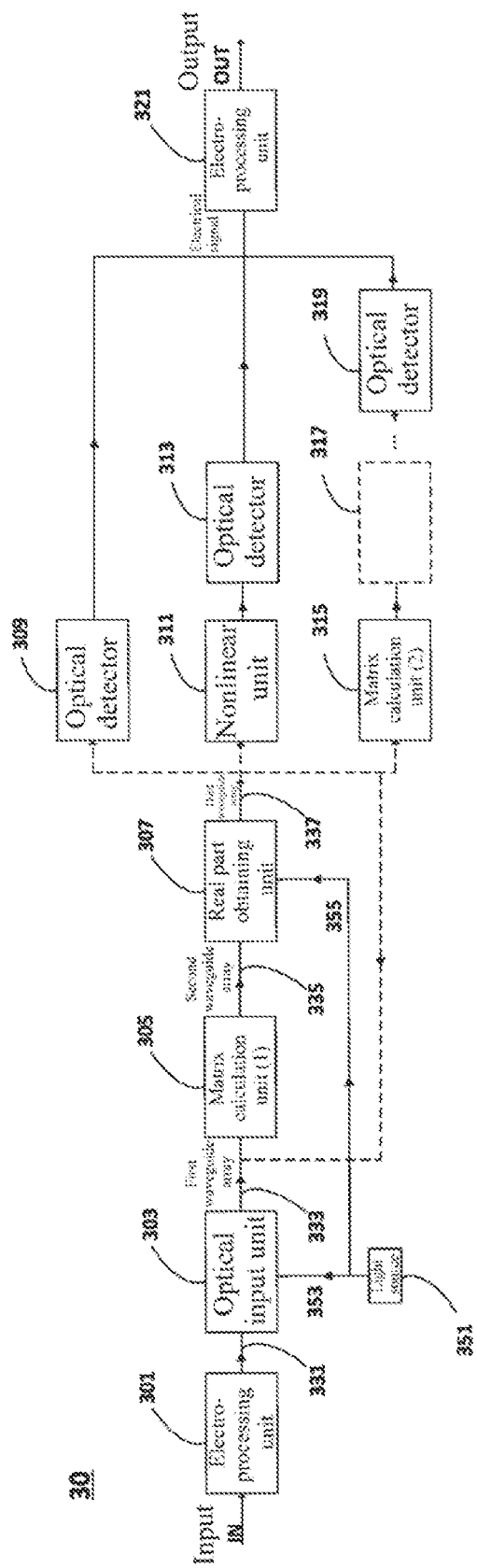
FIG. 3 shows a schematic block diagram of a computing system according to some embodiments of the present disclosure.

For example, the first array of light may be input to the light receiving port 103 as an input vector through an optical input unit (for example, see 303 in FIG. 3). The optical input unit may be, for example (but not limited to), an optical modulator (or an array of the optical modulator). Examples of the optical modulator may include, but are not limited to: an electro-optic modulator, an acousto-optic modulator, or a thermo-optic modulator. The optical input unit may be separate from an optical chip, or may also be integrated onto the optical chip. In other words, the optical input unit may be integrated with part or all of the computing apparatus 10 in the same chip.

Figure 4:
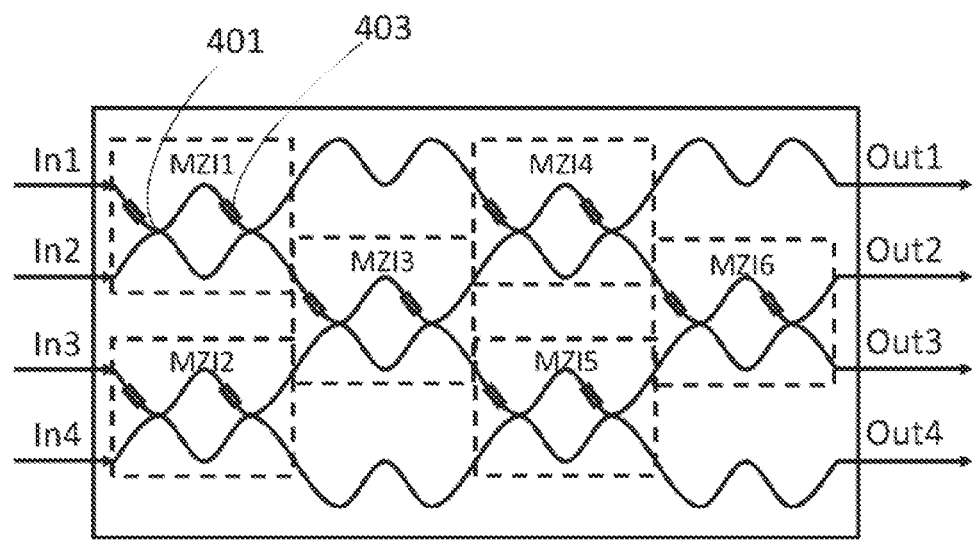
FIG. 4 shows a schematic diagram of a Mach-Zehnder interferometer (MZI)

As an example, as shown in FIG. 4, the first optical signal 111 may include light received from four inputs In1-In4. In this case, the first array of light forms a vector having four elements, and the vector may represent a vector of a 4×4 input matrix, such as a column vector.

The matrix calculation unit 101 uses the transmission matrix thereof to process the received first optical signal 111 (the first array of light) to obtain the second optical signal 113. Herein, in some implementations, the processing may be a linear operation. For example, the linear operation may be multiplying the transmission matrix S (or M) by an input vector. However, it should be understood that the present disclosure is not limited thereto. Those skilled in the art may select an appropriate linear operation or an appropriate processing operation based on the present disclosure.

Thus, the second optical signal 113 may include a second array of light. It is easy to understand that the second array of light may represent a result, such as a product, of processing (for example, the linear operation) of the transmission matrix and the input matrix or the vector of the input matrix.

The real part obtaining unit 105 obtains, from the second optical signal 113, the third optical signal 115 representing the real part of the complex amplitude of the second optical signal 113. Mathematically, it is equivalent to the real part obtaining unit 105 projecting the complex amplitude of the optical signal that represents an optical matrix computing result onto a real axis of a complex plane, that is, extracting the real part of the complex amplitude of the optical signal. In some implementations, the real part obtaining unit 105 is configured to: for each member in the second array of light, use reference light (for example, through interference between the member and the reference light) to generate output light representing a real part of a complex amplitude of the member. In some other implementations, the real part obtaining unit 105 is configured to: for two members in the second array of light, use the two members (for example, through interference between the two members) to generate corresponding output light representing a real part of a complex amplitude of each of the two members.

Thus, the third optical signal 115 may represent a real part of a matrix that is used as an operation result (for example, a product) of the transmission matrix and the input matrix or the vector of the input matrix.

According to some embodiments of the present disclosure, the computing apparatus may use the transmission matrix (which is a unitary matrix) of the matrix calculation unit thereof to represent any real matrix, so as to implement a linear operation (for example, a multiplication) of the real matrix and the input vector (or the input matrix). In addition, a real part of a complex amplitude of light representing a computing result may be extracted by the real part obtaining unit to obtain the operation result (for example, the product).

In addition, according to some embodiments of the present disclosure, the transmission matrix of the matrix calculation unit 101 is a unitary matrix, so that the transmission matrix thereof may be implemented by only one Mach-Zehnder interferometer (MZI). Therefore, according to the computing apparatus of some embodiments of the present disclosure, any real matrix may be represented by only one MZI to perform an operation. As described above, it is required to perform SVD on the matrix to decompose the real matrix into two unitary matrices and one diagonal matrix, and that the two unitary matrices and the one diagonal matrix are represented by three MZIs.

In some embodiments, the minimum number of MZI units included in one Mach-Zehnder interferometer (MZI) used to implement a transmission matrix M' of the matrix calculation unit is the same as the minimum number of MZI units included in an MZI that is capable of being used to implement a representation of a higher-dimensional matrix in U or V.

This is described in more detail below by using the Mach-Zehnder interferometer (MZI) as an example.

The Mach-Zehnder interferometer (MZI) may include one or more units (hereinafter also referred to as MZI units). FIG. 4 shows a schematic diagram of an MZI. The MZI has four inputs and four outputs. The MZI has six MZI units MZI1 to MZI6. In some cases, an MZI having a plurality of MZI units as shown in FIG. 4 is also referred to as an MZI array or an MZI network.

Typically, as shown in FIG. 4, an MZI unit may include two 2×2 (that is, two inputs-two outputs) directional couplers (or beam splitters) and at least one phase shifter (for example, in FIG. 4, there are two phase shifters).

Two optical signals enter into the MZI unit and are then output from the MZI unit, and proportion and relative phase delay of the two optical signals may be adjusted through a thermal effect/an electrical effect. Such adjustability is described by a 2×2 unitary matrix:

$$M_{mzi} = \begin{pmatrix} e^{i\varphi}\sin\theta & e^{i\varphi}\cos\theta \\ \cos\theta & -\sin\theta \end{pmatrix}$$

where θ and Ψ are parameters of the phase shifters.

A plurality of MZI units may be connected to each other in a certain geometric topology to form a network. This MZI network may implement a representation of any N×N unitary matrix based on a mathematical method; for example, an MZI network in FIG. 4 may represent any 4×4 unitary matrix. Therefore, one MZI network may be used to implement the matrix calculation unit 101, so as to implement an operation of multiplying input optical data by any N×N unitary matrix.

Furthermore, any matrix M may be decomposed, through SVD, as a multiplication of two unitary matrices U and V (or $V^T$, namely a transposed matrix of V) and a diagonal matrix Σ, that is, M=UΣV. The diagonal matrix may also be represented by the MZI. Therefore, the photonic matrix calculation unit 101 formed by cascading three different MZI networks can perform multiplication of any matrix by the input matrix (or a vector thereof).

Figure 5:
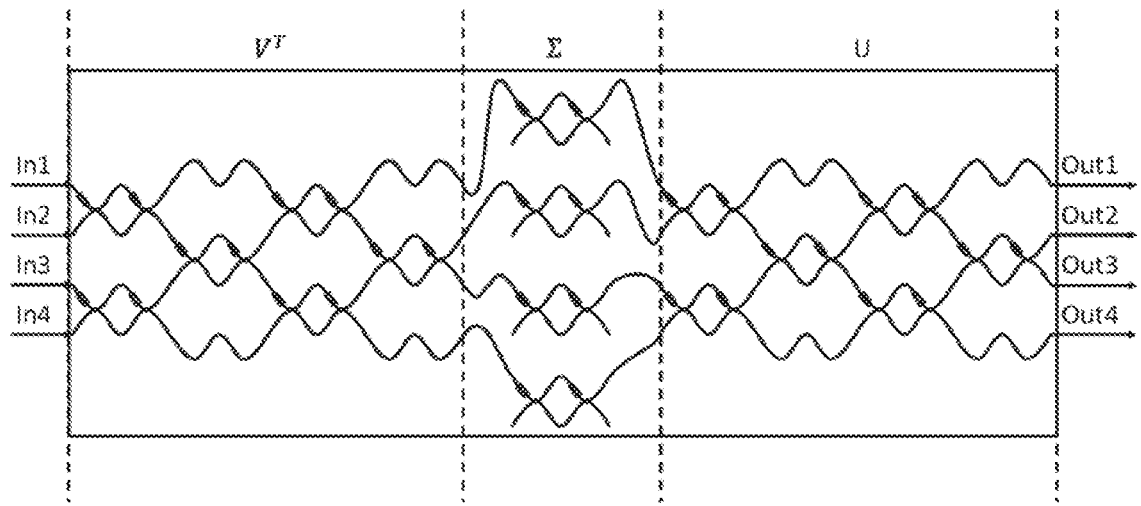
FIG. 5 shows a schematic diagram of an example in which a matrix M is decomposed through singular value decomposition (SVD) to obtain an MZI representation of a matrix $U\Sigma V^T$.

FIG. 5 is a schematic diagram of an example in which a matrix Ma is decomposed through SVD to obtain an MZI representation of a matrix $U\Sigma V^T$. As shown in FIG. 5, Σ, and $V^T$ are respectively represented by an MZI (or an MZI network), as divided by dashed lines in FIG. 5. A target matrix Ma is represented by the three cascaded MZIs. The cascaded MZIs shown in FIG. 5 may represent any 4×4 matrix Ma, that is, it may be described as follows between the input light and the output light:

$$\begin{pmatrix} \sqrt{I_{out1}}\exp(j\Phi_1) \\ \sqrt{I_{out2}}\exp(j\Phi_2) \\ \sqrt{I_{out3}}\exp(j\Phi_3) \\ \sqrt{I_{out4}}\exp(j\Phi_4) \end{pmatrix} = M_a \begin{pmatrix} \sqrt{I_{in1}} \\ \sqrt{I_{in2}} \\ \sqrt{I_{in3}} \\ \sqrt{I_{in4}} \end{pmatrix}.$$

However, in fact, since an existing optical detector can only detect light intensity rather than directly detecting a phase, and both the real part and the imaginary part of the complex amplitude of light contribute to the light intensity, the optical detector actually detects a square of the modulus of the complex amplitude of the light.

In another aspect, for a conventional photonic neural network architecture, only when M is a real matrix, output phases of all ports are zeros, and an output amplitude can be obtained directly by taking the square root of an optical detector signal (according to optical principles, the light intensity is proportional to a square of the amplitude of a light wave). Once a phase parameter in the neural network is disturbed, M is no longer a real matrix, so that the accurate computing result cannot be obtained from the optical detector signal.

Therefore, the matrix represented by the three cascaded MZIs respectively representing the unitary matrices U and V (or $V^T$) and the diagonal matrix Σ is actually limited to a real matrix. According to some embodiments of the present disclosure, it is possible to avoid using three cascaded MZIs to represent any real matrix, and only one MZI is used to represent any real matrix for an operation.

Hereinafter, some concepts of the present disclosure are further explained in conjunction with matrix operations.

It is assumed that there is an m x n arbitrary real matrix M. The matrix is decomposed through SVD as follows:

$$M=U\Sigma V^T$$

where U and $V^T$ are unit orthogonal matrices, that is, $UU^T=1$ and $VV^T=1$; and Σ is a diagonal matrix in which there is a non-zero value only on a main diagonal and other elements are all zeros. Dimensions of the above matrices are $U \in R_{m \times m}$, $\Sigma \in R_{m \times n}$, $V \in R_{n \times n}$.

Generally, if a dimension of M is 3×3, Σ has the following form:

$$\Sigma = \begin{bmatrix} \sigma_1 & 0 & 0 \\ 0 & \sigma_2 & 0 \\ 0 & 0 & \sigma_3 \end{bmatrix}$$

In other words, Σ has elements $\sigma_k$ on the main diagonal. According to requirements, in some embodiments, Σ may be divided by a coefficient α, such that $\sigma_1'$, $\sigma_2'$, $\sigma_3' \leq 1$. This is because a diagonal matrix of a photonic MZI network can only attenuate light, and cannot intensify light. The simulated diagonal matrix is normalized such that elements thereof are not greater than 1. In this case, Σ becomes $$\Sigma' = \frac{\Sigma}{\alpha} = \begin{bmatrix} \sigma_1' & 0 & 0 \\ 0 & \sigma_2' & 0 \\ 0 & 0 & \sigma_3' \end{bmatrix}, \sigma_1', \sigma_2', \sigma_3' \leq 1$$

The coefficient α may be used for compensation by gain matching at a position of the detector. However, it should be understood that the normalization is optional. On the one hand, it may not be necessary to perform additional normalization processing for certain matrices, and on the other hand, processing of the coefficient a may be performed outside the matrix calculation unit.

After that, an imaginary part may be added to at least one element of Σ or Σ', so that the element becomes a complex number whose imaginary part is not 0. The following continues with the description by using a normalized matrix Σ' as an example.

An imaginary part may be added to at least one element of Σ', so that the element becomes a complex number whose imaginary part is not 0. Herein, generally, general cases in which each element of Σ' is not 1 or −1 are considered. An imaginary part is added to each element of Σ', so that each element of Σ' becomes a complex number whose modulus is 1. In this case, Σ' becomes Σ", where $$\Sigma'' = \begin{bmatrix} \sigma_1' + i\sigma_{i1}' & 0 & 0 \\ 0 & \sigma_2' + i\sigma_{i2}' & 0 \\ 0 & 0 & \sigma_3' + i\sigma_{i3}' \end{bmatrix},$$

Herein, $\sigma_{i1}'=\pm\sqrt{1-\sigma_1'^2}$, $\sigma_{i2}'=\pm\sqrt{1-\sigma_2'^2}$, and $\sigma_{i3}'\pm\sqrt{1-\sigma_3'^2}$ Because the imaginary part may be a positive number or negative number, there are $2^N$ possibilities for Σ" and N is the number of elements of Σ. Herein, it should be understood that for the case where σ'$_1$ is 1 or −1, there is no need to add the imaginary part.

In this case, $$\Sigma''\Sigma''^\dagger =$$

$$\begin{bmatrix} (\sigma'_1 + i\sigma'_{i1})(\sigma'_1 - i\sigma'_{i1}) & 0 & 0 \\ 0 & (\sigma'_2 + i\sigma'_{i2})(\sigma'_2 - i\sigma'_{i2}) & 0 \\ 0 & 0 & (\sigma'_3 + i\sigma'_{i3})(\sigma'_3 - i\sigma'_{i3}) \end{bmatrix} =$$

$$\begin{bmatrix} \sigma'^2_1 + \sigma'^2_{i1} & 0 & 0 \\ 0 & \sigma'^2_2 + \sigma'^2_{i2} & 0 \\ 0 & 0 & \sigma'^2_3 + \sigma'^2_{i3} \end{bmatrix} = \begin{bmatrix} 1 & 0 & 0 \\ 0 & 1 & 0 \\ 0 & 0 & 1 \end{bmatrix} = I$$

Moreover, |det(Σ")|=1. Therefore, Σ" is a unitary matrix. In some embodiments, E" is a unitary matrix in which at least one element on a main diagonal is a complex number whose imaginary part is not 0. In addition, in some embodiments, a modulus of each element on a main diagonal of E" is 1.

It is noted that when there is no need to consider the coefficient α, elements in Σ" that correspond to elements $\sigma_k$ are $(\sigma_k + i\sigma_{1k})$, where i represents an imaginary number, $\sigma_{lk} = \pm\sqrt{1-\sigma_k^2}$, where l and k are positive integers. In the case of considering (α, elements in E" that correspond to the elements $\sigma_k$ are $(\sigma'_k + i\sigma'_{1k})$, where i represents an imaginary number, $$\sigma'_k = \frac{\sigma_k}{\alpha}, \sigma'_{lk} = \pm\sqrt{1-\sigma_k'^2},$$

where l and k are positive integers.

Then, M'=UΣ"V$^T$ is calculated. Because U and V$^T$ are unit orthogonal matrices, which are also unitary matrices, Σ" satisfies Σ"Σ"$^t$ and |det(Σ")|=1, and therefore Σ" is also a unitary matrix. The product of the unitary matrix is still a unitary matrix, and therefore M' is also a unitary matrix and may be represented by one Mach-Zehnder interferometer network. It is noted that, in this example, M' is a comple matrix.

The real part of M'

$$\text{Re}(M') = \text{Re}(U\Sigma''V^T) = \text{Re}\left(U\begin{bmatrix} \sigma'_1 + i\sigma'_{i1} & 0 & 0 \\ 0 & \sigma'_2 + i\sigma'_{i2} & 0 \\ 0 & 0 & \sigma'_3 + i\sigma'_{i3} \end{bmatrix}V^T\right) =$$

$$U\begin{bmatrix} \sigma'_1 & 0 & 0 \\ 0 & \sigma'_2 & 0 \\ 0 & 0 & \sigma'_3 \end{bmatrix}V^T = U\Sigma'V^T = \frac{U\Sigma V^T}{\alpha} = \frac{M}{\alpha}$$

Therefore, the real part of the unitary matrix may represent any real matrix. In this example, the real part of the unitary matrix represents the any real matrix whose determinant modulus is less than 1. On this basis, the coefficient may be further multiplied to represent any real matrix.

The following description is provided by using an example in which a 2×2 directional coupler array is used as a real part obtaining unit. Any optical signal $E_{out}(=\sqrt{I_{out}} \exp(j\Phi))$ output from the photonic matrix calculation unit 101 is used as an input of a 2×2 directional coupler in the real part obtaining unit, and reference light $E_{ref}$ with a certain intensity from a same light source is used as another input of the 2×2 directional coupler. The two outputs of the directional coupler are as follows:

$$I_1 = |E_{ref}|^2 - |E_{out}|^2 - 2|E_{out}||E_{ref}|\cos(\varphi)$$

$$I_2 = |E_{ref}|^2 + |E_{out}|^2 - 2|E_{out}||E_{ref}|\cos(\varphi)$$

φ represents a phase difference of the two channels of light. Generally, a phase of the reference light is set as 0 and an amplitude unit is 1. Since the reference light is not attenuated by the Mach-Zehnder interferometer network, the reference light is significantly stronger than the calculated output light (that is, $E_{ref} >> E_{out}$). Therefore, an output result of the real part obtaining unit is approximately a sum of a constant unit 1 and the real part of the complex amplitude of the calculated output light Re $(E_{out}) = E_{out}|\cos\Phi$ (herein, as shown in the above formula, the result is actually twice the real part). After a certain arbitrary output of the 2×2 directional coupler is received by the detector, the real part of the complex amplitude of the calculated output light is obtained through high-pass filtering.

In some embodiments, the two outputs may be connected to two different detectors, respectively. In a balanced detection method, the outputs are proportional to $I_2-I_1$, thus outputs that are 4 times the real part of the complex amplitude of the calculated output light are obtained. An optical signal represented by the real part of the complex amplitude of the calculated output light may essentially be regarded as a result of the multiplication of the input optical signal and the real part of the matrix that is represented by the matrix calculation unit 101, that is, $$\begin{pmatrix} \sqrt{I_{out1}}\cos(\Phi_1) \\ \sqrt{I_{out2}}\cos(\Phi_2) \\ \sqrt{I_{out3}}\cos(\Phi_3) \\ \sqrt{I_{out4}}\cos(\Phi_4) \end{pmatrix} = \text{Re}\begin{pmatrix} \sqrt{I_{out1}}\exp(j\Phi_1) \\ \sqrt{I_{out2}}\exp(j\Phi_2) \\ \sqrt{I_{out3}}\exp(j\Phi_3) \\ \sqrt{I_{out4}}\exp(j\Phi_4) \end{pmatrix} = \text{Re}(M_a)\begin{pmatrix} \sqrt{I_{in1}} \\ \sqrt{I_{in2}} \\ \sqrt{I_{in3}} \\ \sqrt{I_{in4}} \end{pmatrix}$$

Therefore, as described above, only one unitary matrix is used to represent any real matrix. According to the embodiments of the present disclosure, an operation of multiplying the input optical data by any real matrix M may be completed in an optical domain, where M is not directly equal to the transmission matrix S of the matrix calculation unit, but only depends on the real part of the transmission matrix S: M=Re(S). Therefore, this is vividly referred to as a pseudo real number photonic computing structure.

Figure 2:
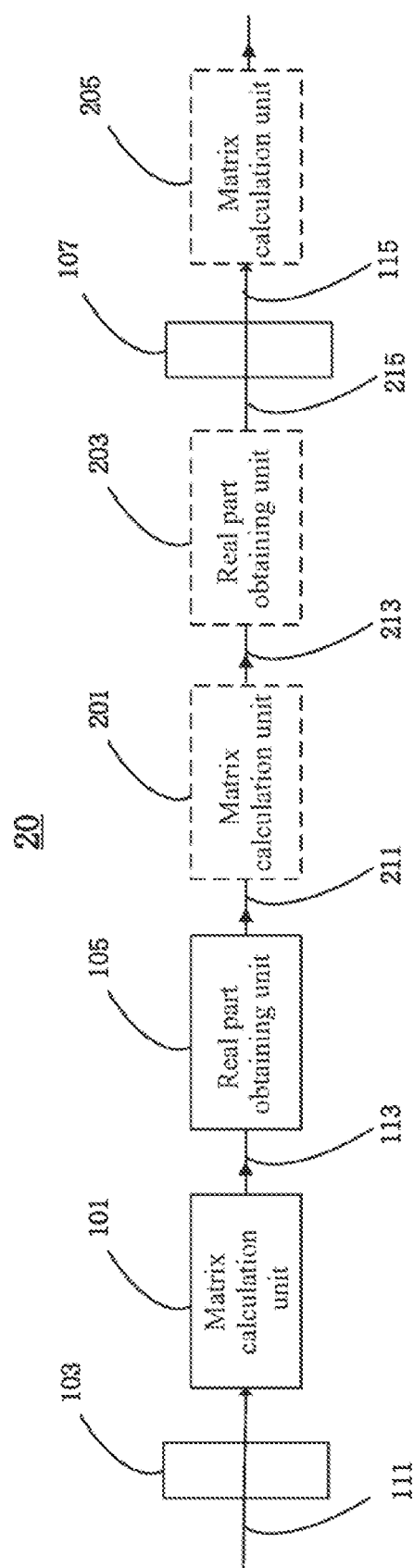
FIG. 2 shows a schematic block diagram of a computing apparatus according to some embodiments of the present disclosure.

FIG. 2 is a schematic block diagram of a computing apparatus according to some embodiments of the present disclosure. Herein, same reference numerals are used for the same components in the computing apparatus shown in FIG. 2 as those in the computing apparatus 10 shown in FIG. 1, the content described above with reference to FIG. 1 may be also applicable, and therefore details are not repeated herein again.

Figure 7:
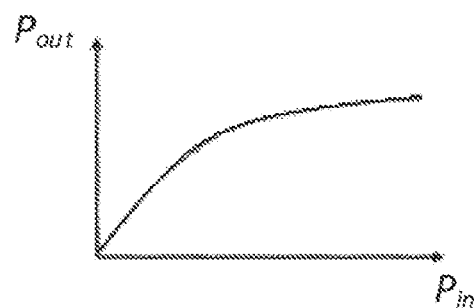
FIG. 7 shows optical nonlinear response characteristics of a nonlinear unit according to some embodiments of the present disclosure.

Compared with the computing apparatus 10 shown in FIG. 1, a computing apparatus 20 shown in FIG. 2 may further include other optical processing units, such as 201 and/or 203. Although the other optical processing units 201 and 203 are respectively shown as the matrix calculation unit 201 and the real part obtaining unit 203 in FIG. 2, the present disclosure is not limited thereto. For example, the other optical processing unit may be another component, such as an optical amplifier (SOA), that performs a linear operation or a nonlinear operation. Certainly, an element suitable for performing an optical nonlinear operation is not limited to the SOA, and others such as saturable absorbers and optical Kerr elements are also optional optical nonlinear operation elements. FIG. 7 shows example optical nonlinear response characteristics of a nonlinear unit (for example, an optical amplifier) according to some embodiments of the present disclosure. As shown in FIG. 7, the power Pout of output light of the nonlinear unit has a nonlinear relationship with the power Pin of input light.

Figure 6:
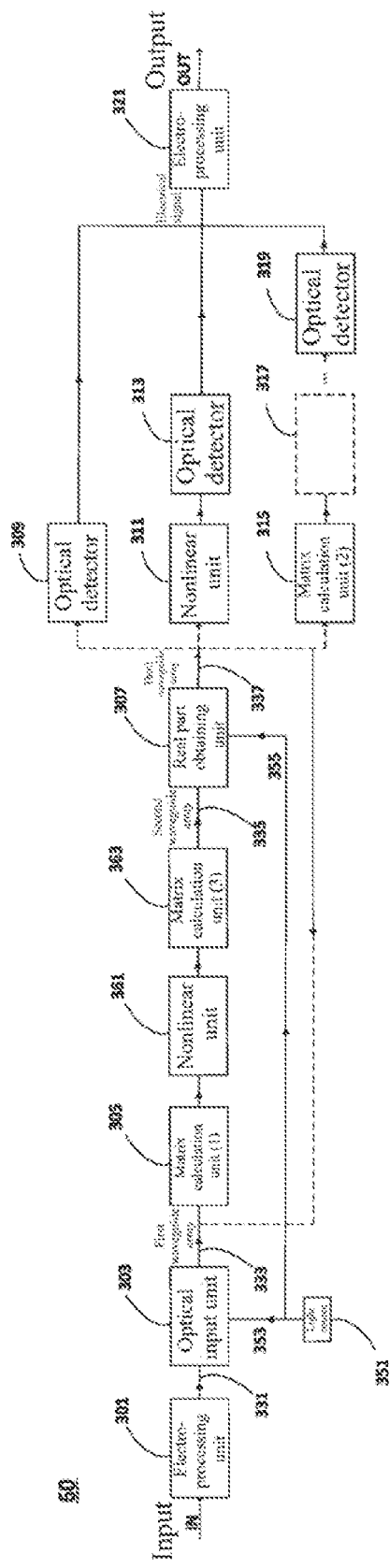
FIG. 6 shows a schematic block diagram of a computing apparatus according to some embodiments of the present disclosure.

In addition, although the other optical processing units 201 and 203 are shown in the downstream of the real part obtaining unit 105 in FIG. 2, the present disclosure is not limited thereto. Those skilled in the art may select other optical processing units and setting modes thereof according to the requirements. For example, as shown in FIG. 6, there may be another suitable optional processing component added between the matrix calculation unit and the real part obtaining unit according to embodiments of the present disclosure.

In this example, the other matrix calculation unit 201 may have a corresponding other transmission matrix. The matrix calculation unit 201 may receive an optical signal 211 (for example, an array of light) output from the real part obtaining unit 105, and use the transmission matrix thereof to perform further processing, such as a linear calculation (for example, a multiplication), on the optical signal 211, to obtain an output optical signal 213. According to different applications, the other matrix calculation unit 201 is configured to receive any one of the optical signals 111, 113, and 115.

Herein, the matrix calculation unit 201 may be a matrix calculation apparatus according to some embodiments of the present invention, a matrix calculation apparatus according to the prior art or developed in the future. For example, the matrix calculation unit 201 may be configured in a similar manner to the matrix calculation unit 101 shown in FIG. 1. The content described above with respect to the matrix calculation unit 101 may be similarly or adaptively applicable to the matrix calculation unit 201. For example, the transmission matrix of the matrix calculation unit 201 may also be a unitary matrix. In some implementations, at least one element of the unitary matrix is a complex number whose imaginary part is not 0. In some implementations, a modulus of each element on a main diagonal of the unitary matrix M' is 1. In some implementations, the matrix calculation unit 201 may be implemented as including one or more of the following: a Mach-Zehnder interferometer (MZI), a multimode interferometer, a directional coupler, a photonic crystal, a micro-ring resonator, another optical component whose operating characteristics are capable of being described by the unitary matrix, or any combination of any of the above apparatuses.

In another implementation, the matrix calculation unit 201 may be a matrix calculation unit known in the art. For example, the matrix calculation unit 201 may use three cascaded MZIs to represent any real matrix.

In a case where the matrix calculation unit 201 is configured in a similar manner to the calculation unit 101, the computing apparatus 20 may further include another real part obtaining unit 203. The content described above with respect to the real part obtaining unit 105 may be similarly or adaptively applicable to the real part obtaining unit 203. For example, the real part obtaining unit 203 may be optically coupled to the matrix calculation unit 201 and configured to obtain, from the optical signal 213, an optical signal 215 representing the real part of the complex amplitude of the second optical signal 213.

According to different embodiments, the optical signal such as 211, 213, or 215 may be output as output light 115 through the output port 107.

Another matrix calculation unit 205 used to receive the output light is shown in FIG. 2. It is easy to understand that, the matrix calculation unit 205 may be a matrix calculation apparatus according to some embodiments of the present invention, a matrix calculation apparatus according to the prior art or developed in the future. Therefore, detailed description for it is not repeated herein again.

According to different applications, in some embodiments, the computing apparatus 20 shown in FIG. 2 may include the matrix calculation unit 205 and another optional component (not shown in the figure). In another embodiment, the computing apparatus 20 shown in FIG. 2 may be included in one layer of a photonic neural network, and the matrix calculation unit 205 may be included in another layer.

FIG. 3 shows a schematic block diagram of a computing apparatus according to some embodiments of the present disclosure. As shown in FIG. 3, a computing apparatus 30 may include a matrix calculation unit 305 and a real part obtaining unit 307. The matrix calculation unit 305 and the real part obtaining unit 307 may be the matrix calculation unit and the real part obtaining unit described herein in conjunction with any embodiment of the present disclosure. Therefore, the related content described above with reference to FIG. 1 and FIG. 2 may be similarly or adaptively applied herein, and the description is not repeated herein again.

The computing apparatus 30 further includes an electro-optic conversion portion. As shown in FIG. 3, the electro-optic conversion portion may include an electro-processing unit 301 and an optical input unit 303. The electro-processing unit may be configured to generate a control signal 331 based on an input IN so as to control the optical input unit 303 to modulate light to generate modulated light. Herein, the input IN may be an electrical signal representing the input matrix or part thereof (for example, one or more vectors). The optical input unit 303 modulates, based on the control signal 331 of the electro-processing unit 301, light 353 received from a light source 351 to form modulated light 333 carrying information representing the input matrix or the vector of the input matrix, so as to transmit to the matrix calculation unit 305.

As described above, the optical input unit may generally be implemented by an optical modulator array. In some specific examples, the modulator may be an electro-optic modulator, an acousto-optic modulator, or a thermo-optic modulator. The modulator may be separate, or may be integrated on the optical chip.

The matrix calculation unit 305 (also referred to as a matrix calculation unit (1)) may be optically coupled to the optical input unit 303 through a port such as a first waveguide array to receive the modulated light 333. Herein, it is easy to understand that the content described above with reference to the first optical signal in FIG. 1 may be similarly or adaptively applied to the modulated light 333.

Similar to the above description, the matrix calculation unit 305 uses the transmission matrix S thereof to perform processing (for example, the linear calculation) on the first optical signal 111 received through the input port 103 to obtain the second optical signal 113. The second optical signal 113 has a complex amplitude. The transmission matrix may be a unitary matrix. In some implementations, at least one element of the unitary matrix is a complex number whose imaginary part is not 0. In some implementations, a modulus of each element on a main diagonal of the unitary matrix M' is 1.

For example, the modulated optical signal 333 is used as the input vector (first array of light), and enters into the matrix calculation unit (1) 305 through the first waveguide array for a linear calculation. For example, the input vector represented by the modulated optical signal is multiplied by the transmission matrix defined by the matrix calculation unit (1) 305. Output light 335 (second array of light), as a computing result, enters into the real part obtaining unit 307 through a second waveguide array.

In the real part obtaining unit 307, a complex amplitude of the optical signal 335 that represents the optical matrix computing result is projected onto a real axis of a complex plane, that is, the real part of the complex amplitude of the optical signal 335 is extracted, such that an output optical signal 337 (a third array of light) representing the real part of the complex amplitude of the optical signal 335 is output and enters into a third waveguide array (which may be used as an output port). In some implementations, as shown in FIG. 3, the real part obtaining unit 307 may receive the light 355 from the light source 351 as the reference light, and use the reference light to extract the real part of the complex amplitude from the light 335 output from the matrix calculation unit 305.

Herein, content described above with respect to the second optical signal 113 and the third optical signal 115 may be similarly or adaptively applied to the optical signal 335 and the optical signal 337.

After that, the optical signal 337 (the third array of light) may be directly received by the optical detector (for example, 309). The optical detector 309 may convert the received optical signal into an electrical signal. In some embodiments, the optical signal 337 may enter a nonlinear unit (for example, a semiconductor optical amplifier (SOA)) 311, and a nonlinear response of the nonlinear unit to the input light is used to perform a nonlinear operation. The optical detector (for example, 313) may be used to receive the operation result and convert the result into an electrical signal.

In some embodiments, the optical signal 337 may enter another matrix calculation unit (2) 315. The matrix calculation unit (2) 315 may be a matrix calculation unit according to the present disclosure, a matrix calculation unit according to the prior art or developed in the future. Light as a computing structure of the matrix calculation unit (2) 315 may be output to one or more other appropriate optional units 317. The unit 317 may be, for example, but not limited to: a real part extraction unit according to the present disclosure, another linear calculation unit, another nonlinear calculation unit, or the like. After that, the output light thereof may be converted into an electrical signal by an optical detector 319.

In addition, as shown in the figure, the light output from the real part extraction unit 307 may also be provided to the first waveguide array to implement feedback and loop computing.

The computing apparatus 30 may further include an electro-processing unit 321 to process electrical signals output from the optical detectors (309, 313, and/or 319). An output of the electro-processing unit 321 may be input to the next-stage computing apparatus (not shown in the figure).

That the MZI shown in FIG. 4 is used as the MZI that implements the transmission matrix of the matrix calculation unit (1) 305 in FIG. 3 is used as an example for description.

Four channels of modulated light (which may be used as vectors of the input matrix) are input to the matrix calculation unit 305 through the optical input unit 303. After passing through the matrix calculation unit 305, four channels of output light are output, which may interfere with four channels of reference light (for example, the light 355 received from the light source 351) at the real part obtaining unit, so that four pairs of optical signals are output. The output four pairs of optical signals may be received by four sets of optical detectors (for example, 309) configured in a balanced detection method, so as to obtain a result of a multiplication of the real part of the photon matrix and the input matrix or the vector. The structure may be processed by a second electro-processing unit, for example, converted into digital data by analog-to-digital conversion.

Next, how some embodiments work is explained by simulating a specific matrix multiplication. The matrix multiplication to be simulated is:

$$\begin{bmatrix} 4 & 7 & 0 & 3 \\ 1 & 0 & 1 & 3 \\ 3 & 5 & 4 & 6 \\ 2 & 8 & 0 & 6 \end{bmatrix} \begin{bmatrix} 4 & 5 & 1 & 1 \\ 8 & 9 & 3 & 6 \\ 8 & 8 & 0 & 0 \\ 1 & 8 & 0 & 4 \end{bmatrix} = \begin{bmatrix} 75 & 107 & 25 & 58 \\ 15 & 37 & 1 & 13 \\ 90 & 140 & 18 & 57 \\ 78 & 130 & 26 & 74 \end{bmatrix}$$

First, an optical chip is used to simulate the first matrix $$\begin{bmatrix} 4 & 7 & 0 & 3 \\ 1 & 0 & 1 & 3 \\ 3 & 5 & 4 & 6 \\ 2 & 8 & 0 & 6 \end{bmatrix}.$$

According to the method mentioned in the detailed description of the embodiments, the matrix is first subjected to SVD, to obtain:

$$U = \begin{bmatrix} -0.51936594 & -0.49877617 & 0.60282961 & -0.34362453 \\ -0.14105075 & 0.47358152 & -0.21050301 & -0.84351272 \\ -0.55440991 & 0.66910018 & 0.30022812 & 0.39344337 \\ -0.63481759 & -0.28150991 & -0.70862403 & 0.1249431 \end{bmatrix}$$

$$\Sigma = \begin{bmatrix} 15.72082954 & 0 & 0 & 0 \\ 0 & 4.55424235 & 0 & 0 \\ 0 & 0 & 2.33277747 & 0 \\ 0 & 0 & 0 & 1.29326892 \end{bmatrix}$$

$$V^T = \begin{bmatrix} -0.3276786 & -0.73063268 & -0.150036 & -0.57990674 \\ -0.01696055 & -0.52654457 & 0.69165889 & 0.49403555 \\ 0.72199416 & 0.02227198 & 0.42456234 & -0.54587106 \\ -0.60914982 & 0.43408601 & 0.56466273 & -0.34880057 \end{bmatrix}$$

It can be seen that the maximum value of the elements in $\Sigma$ is 15.72082954, and when the coefficient is $\alpha=16$, the following is obtained:

$$\Sigma' = \frac{\Sigma}{16} = \begin{bmatrix} 0.98255185 & 0 & 0 & 0 \\ 0 & 0.28464015 & 0 & 0 \\ 0 & 0 & 0.14579859 & 0 \\ 0 & 0 & 0 & 0.08082931 \end{bmatrix}$$

Next, an imaginary part is added to Σ', to obtain:

$$\Sigma'' = \begin{bmatrix} 0.98255185 + 0.1859889i & 0 & 0 & 0 \\ 0 & 0.28464015 + 0.95363444i & 0 & 0 \\ 0 & 0 & 0.14579859 + 0.98931429i & 0 \\ 0 & 0 & 0 & 0.08082931 + 0.99672796i \end{bmatrix}$$

M' = UΣ"V$^T$ is calculated, to obtain:

$$M' = \begin{bmatrix} 0.25 + 0.67898466i & 0.4375 + 0.18694875i & -0.25641286i & 0.1875 - 0.38628996i \\ 0.0625 + 0.36268279i & -0.58947667i & 0.0625 - 0.24521505i & 0.1875 + 0.64643582i \\ 0.1875 - 0.00152568i & 0.3125 - 0.08555434i & 0.25 + 0.80665576i & 0.375 + 0.07776322i \\ 0.125 - 0.53874965i & 0.5 + 0.26680586i & -0.39626035i & 0.375 + 0.27439238i \end{bmatrix}$$

It can be seen that the real part of M' is $$\mathrm{Re}(M') = \begin{bmatrix} 0.25 & 0.4375 & 0 & 0.1875 \\ 0.0625 & 0 & 0.0625 & 0.1875 \\ 0.1875 & 0.3125 & 0.25 & 0.375 \\ 0.125 & 0.5 & 0 & 0.375 \end{bmatrix} = \frac{M}{16}$$

Therefore, the multiplication of the real part of the unitary matrix M' and the input modulated light vector can be successfully simulated by using the pseudo real number photonic computing structure.

Further, the modulated light vector is input, and then an expression of the modulated light may be used to simulate the second matrix $$\begin{bmatrix} 4 & 5 & 1 & 1 \\ 8 & 9 & 3 & 6 \\ 8 & 8 & 0 & 0 \\ 1 & 8 & 0 & 4 \end{bmatrix}.$$

Because there are four input channels In1 to In4, four numbers may be sent per clock. The second matrix is sent in four clocks, $$\begin{bmatrix} 4 \\ 8 \\ 8 \\ 1 \end{bmatrix}$$

is sent in the first clock, $$\begin{bmatrix} 5 \\ 9 \\ 8 \\ 8 \end{bmatrix}$$

is sent in the second clock, $$\begin{bmatrix} 1 \\ 3 \\ 0 \\ 0 \end{bmatrix}$$

is sent in the third clock, and $$\begin{bmatrix} 1 \\ 6 \\ 0 \\ 4 \end{bmatrix}$$

is sent in the fourth clock.

Four sets of computing results are successively received at the four output ports Out1 to Out4, respectively. Theoretically, an expression of a light wave received in the first clock is:

$$M' \begin{bmatrix} 4 \\ 8 \\ 8 \\ 1 \end{bmatrix} = \begin{bmatrix} 4.6875 + 1.77393584i \\ 0.9375 - 4.5803668i \\ 5.625 + 5.84047181i \\ 4.875 - 2.91624213i \end{bmatrix},$$

an expression of a light wave received in the second clock is:

$$M' \begin{bmatrix} 4 \\ 8 \\ 8 \\ 1 \end{bmatrix} = \begin{bmatrix} 6.6875 - 0.06416048i \\ 2.3125 - 0.28210994i \\ 8.75 + 6.29773432i \\ 8.125 - 1.26743928i \end{bmatrix},$$

an expression of a light wave received in the third clock is:

$$M' \begin{bmatrix} 4 \\ 8 \\ 8 \\ 1 \end{bmatrix} = \begin{bmatrix} 1.5625 + 1.23983092i \\ 0.0625 - 1.405747231i \\ 1.125 - 0.25818871i \\ 1.1625 + 0.26166794i \end{bmatrix},$$

and an expression of a light wave received in the fourth clock is:

$$M' \begin{bmatrix} 4 \\ 8 \\ 8 \\ 1 \end{bmatrix} = \begin{bmatrix} 3.625 + 0.25551733i \\ 0.8125 - 0.58843397i \\ 3.5625 - 0.20379886i \\ 4.625 + 2.15965504i \end{bmatrix}.$$

Real parts of the four results are extracted and combined, and then multiplied by the coefficient α=16, to obtain the result as follows:

$$\begin{bmatrix} 75 & 107 & 25 & 58 \\ 15 & 37 & 1 & 13 \\ 90 & 140 & 18 & 57 \\ 78 & 130 & 26 & 74 \end{bmatrix},$$

The result is the same as the theoretical result, indicating that the computing result is correct and the optical chip can perform matrix operations.

FIG. 6 is a schematic block diagram of a computing apparatus according to some embodiments of the present disclosure. Most of the components of a computing apparatus 60 shown in FIG. 6 are the same as those shown in FIG. 3, which are denoted by the same reference numerals, which are not repeated herein. A difference between the computing apparatus 60 shown in FIG. 6 and the computing apparatus 30 shown in FIG. 3 lies in that the computing apparatus 60 further includes other optical processing units. In FIG. 6, one or more optical processing units are shown as added. Herein, optical processing units 361 and 363 are schematically shown.

As an example, the unit 361 may be a nonlinear unit, for example, an optical amplifier. The unit 363 may be a matrix calculation unit, which may be a calculation unit according to the embodiments of the present disclosure, a calculation unit known in the prior art, or another calculation unit developed in the future. The light that represents the computing structure and that is output from the matrix calculation unit (1) 305 may be processed (for example, optically amplified) by the nonlinear unit, and further subjected to a linear calculation by the matrix calculation unit (3). After that, the light as the computing result enters the real part obtaining unit 307 through the matrix calculation unit, for example, the waveguide array.

It should be understood that, although the other processing units are added between the matrix calculation unit (1) 305 and the real part obtaining unit 307, as shown in FIG. 6, the present disclosure is not limited thereto. Those skilled in the art may appropriately provide another processing unit based on the teaching of the present disclosure.

Figure 8:
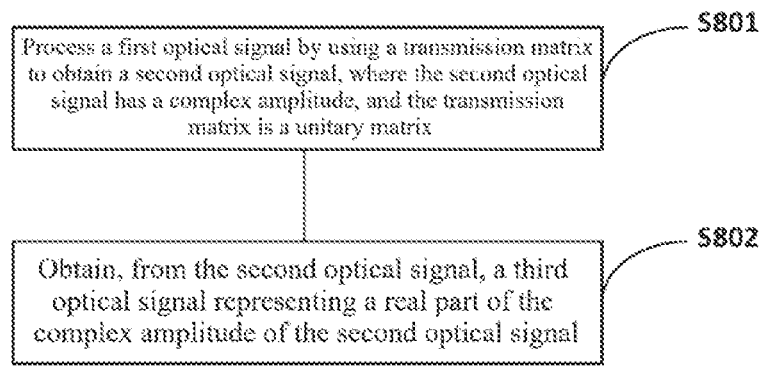
FIG. 8 shows a flowchart of a computing method according to some embodiments of the present disclosure.

FIG. 8 is a flowchart of a computing method according to some embodiments of the present disclosure. As shown in FIG. 8, the method may include the following step. In step S801, a first optical signal is processed by using a transmission matrix to obtain a second optical signal, where the second optical signal has a complex amplitude, and the transmission matrix is a unitary matrix M'.

The method further includes the following step. In step S802, a third optical signal representing a real part of the complex amplitude of the second optical signal is obtained from the second optical signal.

In some embodiments, at least one element of the unitary matrix M' is a complex number whose imaginary part is not 0.

In some embodiments, the first optical signal may include a first array of light, and the first array of light is configured to represent an input matrix or a vector of the input matrix. The second optical signal may include a second array of light, and the second array of light is configured to represent a product of the transmission matrix and the input matrix or the vector of the input matrix. The third optical signal may be configured to represent a real part of a matrix that is used as the product of the transmission matrix and the input matrix or the vector of the input matrix.

In some embodiments, the unitary matrix M' is capable of being decomposed as a product of three sub-unitary matrices U, Σ", and $V^T$, that is, the unitary matrix is M'=UΣ"$V^T$, where U and $V^T$ are unitary matrices, and E" is a unitary matrix in which at least one element on a main diagonal is a complex number whose imaginary part is not 0.

In some embodiments, a modulus of each element on the main diagonal of the matrix Σ" is 1.

In some embodiments, the unitary matrix M' is determined based on a target matrix M to be multiplied by the input matrix or the vector of the input matrix, where the target matrix M is a real matrix. The target matrix M can be decomposed as M=UΣ$V^T$ through singular value decomposition, where U and $V^T$ are real unit orthogonal matrices, E is a real diagonal matrix in which there is a non-zero element only on a main diagonal and other elements are all zeros, and E" is obtained by adding an imaginary part to at least one element on a main diagonal of E.

In some embodiments, the unitary matrix M' is determined based on a target matrix M to be multiplied by the input matrix or the vector of the input matrix, where the target matrix M is a real matrix. The target matrix M can be decomposed as M=UΣ$V^T$ through singular value decomposition, where U and $V^T$ are real unit orthogonal matrices, and E is a real diagonal matrix in which there is a non-zero element only on a main diagonal and other elements are all zeros. Σ" is obtained by the following: dividing Σ by a coefficient α such that all elements of Σ" are less than or equal to 1; and adding an imaginary part to at least one element on the main diagonal of Σ.

In some embodiments, Σ has elements $\sigma_k$ on a main diagonal, an element in Σ" that correspond to the elements $\sigma_k$ are $(\sigma_k + i\sigma_{Ik})$, where i represents an imaginary number, and $\sigma_{Ik} = \pm\sqrt{1-\sigma_k^2}$ .

In some embodiments, Σ has elements $\sigma_k$ on a main diagonal, elements in Σ" that correspond to the elements $\sigma_k$ are $(\sigma'_k + i\sigma'_{Ik})$, where i represents an imaginary number, $$\sigma'_k = \frac{\sigma_k}{\alpha}, \text{ and } \sigma'_{Ik} = \pm\sqrt{1-\sigma_k'^2}.$$

and $\sigma'_{Ik} = \pm\sqrt{1-\sigma'_k^2}$.

In some embodiments, the obtaining, from the second optical signal 113, a third optical signal 115 representing a real part of the complex amplitude of the second optical signal 113 includes: for each member in the second array of light, using reference light to generate output light representing a real part of a complex amplitude of the member.

In some embodiments, the obtaining, from the second optical signal 113, a third optical signal 115 representing a real part of the complex amplitude of the second optical signal 113 includes: for two members in the second array of light, generating corresponding output light representing a real part of a complex amplitude of each of the two members.

In some embodiments, the transmission matrix M' is represented by only one Mach-Zehnder interferometer (MZI). In some embodiments, the minimum number of MZI units of an MZI used to implement a representation of a transmission matrix M' is the same as the minimum number of MZI units of an MZI that can be used to implement a representation of a higher-dimensional matrix in U or V.

Figure 9:
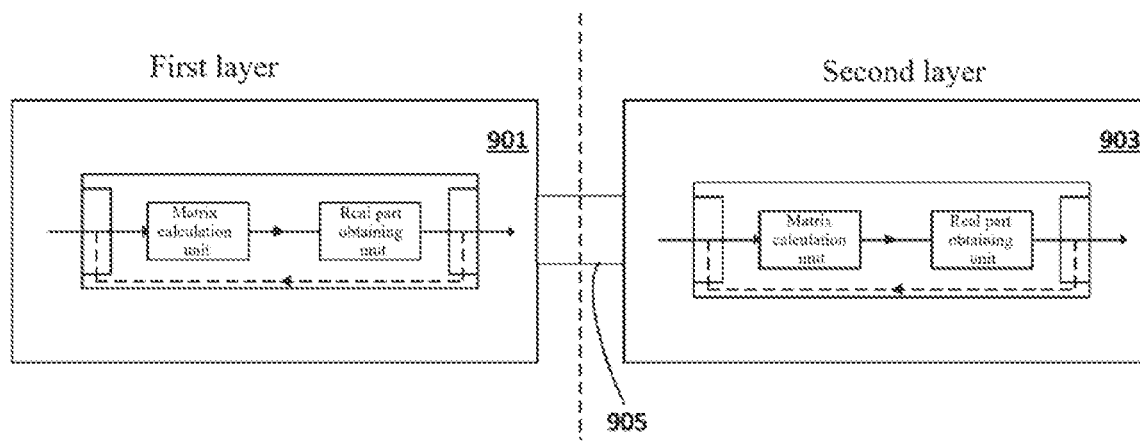
FIG. 9 shows a schematic block diagram of a computing system according to some embodiments of the present disclosure.

FIG. 9 is a schematic block diagram of a computing system according to some embodiments of the present disclosure. According to some aspects of the present disclosure, a computing system is further provided. The computing system according to embodiments of the present disclosure may include at least one layer, for example, a first layer 901 and a second layer 903, as shown in FIG. 9. The first layer 901 and the second layer 903 may communicate with each other through a communication path 905. At least one of the first layer 901 and the second layer 903 may include the computing apparatus as described according to any of the embodiments disclosed herein. For example, as shown in FIG. 9, the first layer 901 may include the computing apparatus shown in any one of FIG. 1 to FIG. 3, and the second layer 903 may include the computing apparatus according to embodiments of the present disclosure, a photon computing apparatus according to the prior art, or any of various appropriate computing apparatus.

In some embodiments, the second layer 903 may be optically coupled to the first layer 901 to perform communication of an optical signal with the first layer. For example, in some embodiments as shown in FIG. 2, the calculation units 101 and 105 may belong to the first layer, and the calculation unit 205 may belong to the second layer. The first layer and the second layer may perform optical communication with each other through an optical path (for example, the port 107).

In some embodiments, the second layer is electrically coupled to the first layer to perform communication with the first layer through an electrical signal. The first layer may further include: an electro-optic conversion apparatus to convert data into an optical signal to be received by the first computing apparatus; and an optical-electro conversion apparatus to convert the optical signal in the first computing apparatus to an electrical signal. The second layer may further include: an electro-optic conversion apparatus to convert data into an optical signal to be received by the second computing apparatus; and an optical-electro conversion apparatus to convert the optical signal in the second computing apparatus to an electrical signal. For example, the first layer may include the computing apparatus shown in FIG. 3, and the second layer may also include the computing apparatus shown in FIG. 3 or a similar computing apparatus.

In some embodiments, the computing system according to the present disclosure may be a neural network system. The computing apparatus, the computing method, and the computing system according to the present disclosure may be applied to many aspects such as gene sequencing, quantum communication, or quantum computing.

According to different embodiments of the present disclosure, the number of Mach-Zehnder interferometer (MZI) networks required to represent an arbitrary real matrix may be reduced from 3 to 1. As a result, the number of phase shifters required is reduced by more than half. Therefore, a computing structure is greatly simplified, and required components and required control circuits are reduced. According to the embodiments of the present disclosure, a signal light loss under the same condition is also greatly reduced.

According to the embodiments of the present disclosure, generally, the number of available matrices for representing an arbitrary real matrix is $2^N$ times that of the existing method (N is the number of elements on a main diagonal in a matrix M' obtained through SVD). Therefore, the difficulty in representing the real matrix is greatly reduced, which is beneficial to improving the accuracy of a representation.

In addition, according to some embodiments of the present disclosure, since the intensity of reference light is significantly stronger than the signal light, the intensity of the output light representing the computing result in the present disclosure is also significantly higher than that of an existing method.

It should be appreciated by those skilled in the art that the boundaries between the operations (or steps) described in the above embodiments are merely illustrative. A plurality of operations may be combined into a single operation, a single operation may be distributed in additional operations, and the operations may be executed at least partially overlapping in time. Furthermore, alternative embodiments may include a plurality of instances of specific operations, and orders of operations may be changed in other various embodiments. However, other modifications, changes and replacements are also possible. Therefore, the specification and drawings should be regarded as illustrative rather than restrictive.

While some specific embodiments of the present disclosure have been exemplarily described in detail, it should be understood by those skilled in the art that the above examples are merely for illustration and are not intended to limit the scope of the present disclosure. The various embodiments disclosed herein may be combined in any combination without departing from the spirit and scope of the present disclosure. Those skilled in the art should also understand that various modifications can be made to the embodiments, without departing from the scope and spirit of the present disclosure. The scope of the present disclosure is defined by the appended claims.

What is claimed is:

1. A computing apparatus, comprising:
   an input port to receive a first optical signal;
   a matrix calculation unit having a transmission matrix and configured to use the transmission matrix to process the first optical signal to obtain a second optical signal, wherein the second optical signal has a complex amplitude, and the transmission matrix is a unitary matrix M', wherein the unitary matrix M' is capable of being decomposed as a product of three sub-unitary matrices U, $\Sigma''$, and $V^T$, and the unitary matrix M' is determined based on a target matrix M to be multiplied by an input matrix or a vector of the input matrix, wherein the target matrix M is a real matrix, the target matrix M is capable of being singular value decomposed as $M=U\Sigma V^T$, wherein U and $V^T$ are real unit orthogonal matrices, wherein $\Sigma$ is a real diagonal matrix where there are non-zero elements only on a main diagonal and other elements are all zeros, and wherein $\Sigma''$ is obtained by:
      adding an imaginary part to at least one element on the main diagonal of $\Sigma$; or
      dividing $\Sigma$ by a coefficient $\alpha$ such that all elements of $\Sigma$ are less than or equal to 1, and adding an imaginary part to at least one element on a main diagonal of $\Sigma$ divided by the coefficient $\alpha$;
   a real part obtaining unit optically coupled to the matrix calculation unit and configured to obtain, from the second optical signal, a third optical signal representing a real part of the complex amplitude of the second optical signal; and
   an output port to output an optical signal.

2. The computing apparatus according to claim 1, wherein:
   at least one element of the unitary matrix is a complex number whose imaginary part is not 0.

3. The computing apparatus according to claim 1, wherein:
   the first optical signal comprises a first array of light configured to represent an input matrix or a vector of an input matrix;

the second optical signal comprises a second array of light configured to represent a product of the transmission matrix and the input matrix or the vector of the input matrix; and the third optical signal is configured to represent a real part of a matrix that is the product of the transmission matrix and the input matrix or the vector of the input matrix.

4. The computing apparatus according to claim 1, wherein:
the unitary matrix $M'=U\Sigma''V^T$,
wherein U and $V^T$ are unitary matrices, and $\Sigma''$ is a unitary matrix in which at least one element on a main diagonal is a complex number whose imaginary part is not 0.

5. The computing apparatus according to claim 1, wherein:
a modulus of each element on the main diagonal of $\Sigma''$ is 1.

6. The computing apparatus according to claim 1, wherein:
$\Sigma$ has elements $\sigma_k$ on a main diagonal, and
elements in $\Sigma''$ that correspond to the elements $\sigma_k$ are $(\sigma_k+i\sigma_{lk})$, wherein i represents an imaginary number, $\sigma_{lk}=\pm\sqrt{1-\sigma_k^2}$, and l and k are positive integers.

7. The computing apparatus according to claim 1, wherein:
$\Sigma$ has elements $\sigma_k$ on a main diagonal,
elements in $\Sigma''$ that correspond to the elements $\sigma_k$ are $(\sigma_k+i\sigma_{lk})$, wherein i represents an imaginary number, $$\sigma'_k = \frac{\sigma_k}{\alpha}, \sigma'_{lk} = \pm\sqrt{1-\sigma_k'^2},$$

and l and k are positive integers.

8. The computing apparatus according to claim 3, wherein the real part obtaining unit is configured to:
for each member in the second array of light, use reference light to generate output light representing a real part of a complex amplitude of the member.

9. The computing apparatus according to claim 3, wherein the real part obtaining unit is configured to:
for two members in the second array of light, generate corresponding output light representing a real part of a complex amplitude of each of the two members.

10. The computing apparatus according to claim 1, wherein:
the matrix calculation unit comprises one or more of:
a Mach-Zehnder interferometer (MZI),
a multimode interferometer,
a directional coupler,
a photonic crystal,
a micro-ring resonator,
an optical component whose operating characteristics are capable of being described by a unitary matrix, or
any combination thereof.

11. The computing apparatus according to claim 1, wherein:
the real part obtaining unit comprises one or more of:
a multimode interferometer,
a directional coupler,
a component capable of implementing light-light interference, or any combination thereof.

12. The computing apparatus according to claim 1, wherein the matrix calculation unit is a first matrix calculation unit, and wherein:

the input port is configured to receive an optical signal from an optical input unit; and/or
the output port is configured to be optically coupled to one or more of:
an optical detector,
a nonlinear optical unit,
a second matrix calculation unit, or
any combination thereof.

13. The computing apparatus according to claim 1, wherein the matrix calculation unit is a first matrix calculation unit and the transmission matrix is a first transmission matrix, the computing apparatus further comprising:
a second matrix calculation unit having a second transmission matrix and configured to use the second transmission matrix to process an input optical signal to obtain an output optical signal,
wherein the second matrix calculation unit is configured to receive any one of the first, second, and third optical signals.

14. The computing apparatus according to claim 13, wherein:
the second transmission matrix is a unitary matrix, at least one element of which is a complex number whose imaginary part is not 0, and the output optical signal has a complex amplitude.

15. The computing apparatus according to claim 1, wherein:
the matrix calculation unit comprises only one Mach-Zehnder interferometer (MZI) to implement the transmission matrix M' of the matrix calculation unit.

16. The computing apparatus according to claim 1, wherein:
the matrix calculation unit comprises only one Mach-Zehnder interferometer (MZI) to implement the transmission matrix M' of the matrix calculation unit,
wherein the MZI comprises a minimum number of MZI units, the minimum number being same as a minimum number of MZI units comprised in an MZI that is capable of implementing one of the matrix U or V that has a higher dimension.

17. A computing method, comprising:
processing a first optical signal by using a transmission matrix M' to obtain a second optical signal, wherein the second optical signal has a complex amplitude, and the transmission matrix is a unitary matrix, wherein the unitary matrix M' is capable of being decomposed as a product of three sub-unitary matrices U, $\Sigma''$, and $V^T$, and the unitary matrix M' is determined based on a target matrix M to be multiplied by an input matrix or a vector of the input matrix, wherein the target matrix M is a real matrix, the target matrix M is capable of being singular value decomposed as $M=U\Sigma V^T$, wherein U and $V^T$ are real unit orthogonal matrices, wherein $\Sigma$ is a real diagonal matrix where there are non-zero elements only on a main diagonal and other elements are all zeros, and wherein $\Sigma''$ is obtained by:
adding an imaginary part to at least one element on the main diagonal of $\Sigma$; or
dividing $\Sigma$ by a coefficient $\alpha$ such that all elements of $\Sigma$ are less than or equal to 1, and adding an imaginary part to at least one element on a main diagonal of $\Sigma$ divided by the coefficient $\alpha$; and
obtaining, from the second optical signal, a third optical signal representing a real part of the complex amplitude of the second optical signal.

18. A computing system comprising at least one layer, wherein the at least one layer comprises a first layer comprising:
- a first computing apparatus comprising:
  - an input port to receive a first optical signal;
  - a matrix calculation unit having a transmission matrix and configured to use the transmission matrix to process the first optical signal to obtain a second optical signal, wherein the second optical signal has a complex amplitude, and the transmission matrix is a unitary matrix M', wherein the unitary matrix M' is capable of being decomposed as a product of three sub-unitary matrices U, $\Sigma''$ and $V^T$, and the unitary matrix M' is determined based on a target matrix M to be multiplied by an input matrix or a vector of the input matrix, wherein the target matrix M is a real matrix, the target matrix M is capable of being singular value decomposed as $M=U\Sigma V^T$, wherein U and V'' are real unit orthogonal matrices, wherein & is a real diagonal matrix where there are non-zero elements only on a main diagonal and other elements are all zeros, and wherein $\Sigma''$ is obtained by:
    - adding an imaginary part to at least one element on the main diagonal of 2; or
    - dividing $\Sigma$ by a coefficient $\alpha$ such that all elements of $\Sigma$ are less than or equal to 1, and adding an imaginary part to at least one element on a main diagonal of $\Sigma$ divided by the coefficient $\alpha$;
  - a real part obtaining unit optically coupled to the matrix calculation unit and configured to obtain, from the second optical signal, a third optical signal representing a real part of the complex amplitude of the second optical signal; and
  - an output port to output an optical signal.

* * * * *